United States Patent
Dvornic et al.

(10) Patent No.: US 7,446,155 B2
(45) Date of Patent: Nov. 4, 2008

(54) CROSS-LINKED NETWORKS CONTAINING NANOSCOPIC REINFORCING DOMAINS

(75) Inventors: Petar R. Dvornic, Midland, MI (US); Jin Hu, Midland, MI (US); Dale J. Meier, Midland, MI (US); Robert M. Nowak, Midland, MI (US)

(73) Assignee: Michigan Molecular Institute, Midland, MI (US)

( * ) Notice: Subject to any disclaimer, the term of this patent is extended or adjusted under 35 U.S.C. 154(b) by 462 days.

(21) Appl. No.: 11/206,459

(22) Filed: Aug. 18, 2005

(65) Prior Publication Data

US 2005/0277746 A1    Dec. 15, 2005

Related U.S. Application Data

(62) Division of application No. 10/452,759, filed on Jun. 2, 2003, now Pat. No. 6,995,215, which is a division of application No. 09/970,366, filed on Oct. 3, 2001, now Pat. No. 6,646,089.

(51) Int. Cl.
  *C08L 83/05* (2006.01)
  *C08L 83/06* (2006.01)
  *C08L 83/07* (2006.01)

(52) U.S. Cl. .......................... 525/474; 528/31; 528/32; 528/10; 528/33; 528/44; 528/86; 528/272; 528/296; 528/302; 528/310; 528/406

(58) Field of Classification Search ................ 528/21, 528/32, 10, 33, 44, 86, 272, 296, 302, 310, 528/406; 525/474
See application file for complete search history.

(56) References Cited

U.S. PATENT DOCUMENTS

| | | |
|---|---|---|
| 5,731,095 A | 3/1998 | Milco et al. |
| 5,739,218 A | 4/1998 | Dvornic et al. |
| 5,834,118 A | 11/1998 | R.ang.nby et al. |
| 5,902,863 A | 5/1999 | Dvornic et al. |
| 5,938,934 A | 8/1999 | Balogh et al. |
| 6,534,600 B2 | 3/2003 | Dvornic et al. |

OTHER PUBLICATIONS

Todd Emrick et al., "An $A_2 + B_3$ Approach To Hyperbranched Aliphatic Polyethers Containing Chain End Epoxy Substituents", Macromolecules, 1999, 32, pp. 6380-6382.

*Primary Examiner*—Kuo-Liang Peng
(74) *Attorney, Agent, or Firm*—Price, Heneveld, Cooper, DeWitt & Litton, LLP (57) ABSTRACT

Hyperbranched polymers having a plurality of at least two different types of functional groups are described. Specific embodiments include hyperbranched polymers having functional groups of a first type that are substantially uniformly distributed throughout the hyperbranched polymer molecule and a second type of functional group that is substantially uniformly distributed at the terminals of the hyperbranched polymer molecule. The hyperbranched polymers having different types of functional groups are synthesized by reacting one or more monomers having functional groups that are capable of reacting during a set of polymerization conditions to form a hyperbranched polymer, wherein at least one of the monomers contains latent functional groups that are not reactive during polymerization.

43 Claims, 1 Drawing Sheet

FIG. 1

CROSS-LINKED NETWORKS CONTAINING NANOSCOPIC REINFORCING DOMAINS

CROSS-REFERENCE TO RELATED APPLICATIONS

This application is a divisional of U.S. application Ser. No. 10/452,759 entitled CROSS-LINKED NETWORKS FROM MULTIFUNCTIONAL HYPERBRANCHED POLYMERS, filed Jun. 2, 2003, now U.S. Pat. No. 6,995,215, which is a divisional of U.S. application Ser. No. 09/970,366, filed on Oct. 3, 2001 entitled HYPERBRANCHED POLYMERS WITH LATENT FUNCTIONALITY AND METHODS OF MAKING SAME, now U.S. Pat. No. 6,646,089, the entire disclosures of which are incorporated herein by reference.

FIELD OF THE INVENTION

This invention relates to hyperbranched polymers having different types of reactive functional groups and methods of preparing hyperbranched polymers having different reactive functional groups.

BACKGROUND OF THE INVENTION

Hyperbranched polymers are tree-like macromolecules that possess more extensive chain branching than traditional branched polymers containing mostly primary and secondary branches attached primarily to linear main-chain backbones, but less extensive and regular than perfectly branched dendrimers. In other words, hyperbranched polymers have a molecular architecture that is intermediate between traditional branched polymers and ideally branched dendrimers.

While several different types of dendrimers containing different reactive functional groups have been prepared by various synthetic strategies, no such counterparts have been reported for hyperbranched polymers. A notable exception to this is hyperbranched macromolecules that result from $AB_x$ polymerization and that ideally contain a single A group in the focal point, if cyclization is suppressed. However, this single functional group per hyperbranched polymer molecule may not be available for further reaction due to such factors as steric hindrance and intramolecular cyclization, and the single functional group is normally present at a negligible concentration such that it generally does not have any utility. Therefore, hyperbranched polymers having a plurality of different functional groups per molecule, and particularly two different functional groups that are reactive under different conditions, are presently unknown.

SUMMARY OF THE INVENTION

This invention pertains to hyperbranched polymers having a plurality of each of at least two different types of functional groups.

In one aspect of the invention, the two different functional groups are reactive under different conditions. In other words, a first type of functional group is reactive and a second type of functional group is not reactive under a first set of conditions, and the first type of functional group is not reactive and the second type of functional group is reactive under a second set of conditions. This allows the first type of functional group to be used for one purpose, such as for cross-linking the hyperbranched polymer molecules to form a network structure, and the second type of functional group for another purpose, such as to form a nanoscopic domain which can act as a particle-like reinforcing agent within the hyperbranched polymer network. In addition to this, the second type of functional group can also be used for attachment of a variety of species, such as molecules of drugs, markers, sensors, catalysts, etc.

Other aspects of the invention relate to cross-linked polymer networks containing hyperbranched domains having a plurality of each of at least one type of functional groups: cross-linked polymer networks containing a nanoscopic inorganic reinforcing agent covalently bonded to the polymer network, hyperbranched polymers containing nanoscopic inorganic particles distributed in and covalently bonded to the hyperbranched polymer, methods of synthesizing hyperbranched polymers having a plurality of each of at least two different types of functional groups, methods of forming cross-linked polymer networks from hyperbranched polymers having a plurality of each of at least two different types of functional groups, methods of preparing cross-linked polymer networks containing a nanoscopic reinforcing agent covalently bonded to the polymer network, and methods of preparing hyperbranched polymers containing nanoscopic inorganic particles distributed in and covalently bonded to the hyperbranched polymer.

These and other features, advantages and objects of the present invention will be further understood and appreciated by those skilled in the art by reference to the following specification and claims.

DESCRIPTION OF THE PREFERRED EMBODIMENTS

The term "hyperbranched polymer" as used in this specification, including the claims, is not intended to encompass dendrimers. Dendrimers of a given generation are monodispersed (typically having a polydispersity of less than about 1.02) highly defined globular molecules, having a degree of branching that is 100%, or very nearly 100%. They are prepared by a series of controlled stepwise growth reactions which generally involve protect-deprotect strategies and purification procedures at the conclusion of each step. As a consequence, synthesis of dendrimers is a tedious and expensive process that places a practical limitation on their applicability.

As is the case with all dendritic polymers (including dendrimers, hyperbranched polymers, and the like), hyperbranched polymers are polymers having branches upon branches. However, in contrast to dendrimers, hyperbranched polymers may be prepared in a one-step, one-pot procedure. This facilitates the synthesis of large quantities of materials, at high yields, and at a relatively low cost. Also, the properties of hyperbranched polymers are different from those of corresponding dendrimers due to imperfect branching and rather large. polydispersities, both of which are governed mainly by the statistical nature of the chemical reactions involved in their synthesis. Therefore, hyperbranched polymers may be viewed as intermediate between traditional branched polymers and dendrimers. More specifically, a hyperbranched polymer molecule contains a mixture of linear and branched repeating units, whereas an ideal dendrimer contains only branched repeating units. The degree of branching, which reflects the fraction of branching sites relative to a perfectly branching system (i.e., an ideal dendrimer), for a hyperbranched polymer is greater than 0 and less than 1, with typical values being from about 0.25 to about 0.45. Unlike ideal dendrimers which have a polydispersity of 1, hyperbranched polymers have typical polydispersities being greater than 1.1 even at a relatively low molecular weight such as 1,000 Daltons, and greater than 1.5 at molecular weights of about 10,000 or higher. These differences between the polydispersities and degree of branching of hyperbranched polymers and dendrimers are indicative of the relatively higher non-ideality, randomness, and irregularity of hyperbranched polymers as compared with dendrimers, and distinguish hyperbranched polymers from dendrimers.

The hyperbranched polymers of this invention may be prepared by any applicable polymerization method, including: (a) monomolecular polymerization of $A_x B_y C_z$ monomers, wherein A and B are moieties that are reactive with each other but not significantly reactive with themselves, x and y are integers having a value of at least 1 and at least one of x or y has a value of at least 2, C is a functional group that is not significantly reactive with either the A or B moieties or itself during polymerization of the hyperbranched polymer and z is an integer having a value of 1, or greater; (b) copolymerization or bi-molecular polymerization of $A_x C_z$ and $B_y$ monomers, wherein A, B and C are moieties as defined above, x and y are integers one of which having a value of at least 2 and the other having a value greater than 2, and z is an integer having a value of at least 1; and (c) multi-molecular polymerization reactions of two or more polyfunctional monomers, wherein the functionality of A or B is at least 2, while the functionality of at least one of A or B is higher than 2 (e.g., $A_2+A_2 C_z+B_3$). The invention also encompasses other synthetic strategies wherein one or more monomers used in the synthesis of hyperbranched polymers contains a latent functional group or groups that do not react significantly under the polymerization conditions. For example, two different monomers each having a latent functional group of the same or different type can be reacted to form a hyperbranched polymer in accordance with this invention (i.e., $A_x C_z+B_y C_w$ or $A_x C_z+B_y D_w$, wherein A, B, C, x, y, and z are as defined above, and D is a second kind of latent functional group that does not react significantly during the A+B polymerization and w is an integer having a value of at least 1). Also, a single monomer (e.g., $A_x B_y C_z D_w$) having x number of A groups and y number of B groups that react with each other during the polymerization and z number of C groups and w number or D groups can be polymerized to form a hyperbranched polymer containing two different types of latent functional groups that are not reactive during the A+B polymerization but are reactive under another set of conditions. In each of the above examples, at least one of x and y must be an integer equal or greater than 2 in order to form a hyperbranched polymer. Other synthetic strategies that may be employed may include any of the preceding systems involving more than two types of reacting functional groups and/or systems involving simultaneous polymerization reactions, such as multi-bond opening or ring opening reactions, step-growth polycondensations or polyadditions, and chain-growth polymerizations. In general, in order to allow synthesis and prevent premature reaction of $AB_x$, $A_x B_y$, $A_x B_y C_z$, $A_x B_y C_z D_w$ or the like monomers, the A and B groups should be unreactive with each other under one set of conditions, such as at normal ambient conditions, but reactive under another set of conditions, such as in the presence of an initiator, catalyst, heating or other type of activation.

In accordance with one aspect of this invention, a hyperbranched polycarbosiloxanes with latent alkoxy functionalities for example may be synthesized by a hydrosilylation polymerization reaction of compounds having two or more vinyl, allyl or other homologous functional group with a dihydrido- or polyhydrido-silane or siloxane, wherein at least one of the monomers includes at least three functional groups that are reactive during polymerization conditions and at least one of the monomers includes at least one latent alkoxy functional group that is substantially unreactive under the polymerization conditions. U.S. patent application Ser. No. 09/753,380, filed Jan. 2, 2001, now U.S. Pat. No. 6,384,172, the contents of which are incorporated by reference herein, describes synthesis of various hyperbranched polycarbosilanes, polycarbosiloxanes, and polycarbosilazenes. An example of such a reaction system may be represented by the following equations:

Where R may be methyl, ethyl, or other monofunctional radical, DVTMDS denotes 1,3-divinyltetramethyldisiloxane.

As illustrated above, the hyperbranched polymers of this invention can be a copolymer of a first monomer having two or more vinyl or allyl reactive functional groups and a second monomer having three or more hydrosilyl reactive functional groups, with at least one of the monomers having at least one latent functional group (such as OR in the previous equations) that does not react significantly during polymerization of the hyperbranched polymer, and with at least one of the monomers having three or more reactive functional groups that do react during the polymerization.

In accordance with a preferred aspect of the invention, the latent functional groups that do not react significantly during polymerization of the hyperbranched polymer may be a hydrolyzable group bonded to a silicon atom. Examples of hydrolyzable groups which can serve as the latent functional groups of the hyperbranched polymers include halogen atoms, —OR, —OCOR, anhydride and —ON=CR'R", wherein R, R' and R" represent an aliphatic or aromatic hydrocarbon group. Preferred hydrolyzable groups include chloro, acetoxy, methoxy and ethoxy groups.

Some specific examples of monomers having vinyl or allyl reactive functional groups and latent hydrolyzable groups include divinyldichlorosilane, 1,3-divinyl-1,3-dimethyl-1,3-dichloro-disiloxane, 1,3-divinyltetraethoxydisiloxane, trivinylethoxysilane, and trivinylmethoxysilane. These monomers can be reacted with monomer having two or more hydrosilyl groups and optionally including latent hydrolyzable groups to produce hyperbranched polymers in accordance with this invention which have two different types of functional groups, including hydrolyzable groups substantially uniformly distributed throughout the hyperbranched polymer molecule and either vinyl, allyl or hydrosilyl groups substantially uniformly distributed as terminal end-groups of the hyperbranched polymer molecules.

Examples of monomers having hydrosilyl groups that can be reacted with the vinyl or allyl functional monomers include hydrosilyl functional monomers without latent hydrolyzable groups, such as 1,1,3,3-tetramethyldisiloxane, methyltris(dimethylsiloxy)silane, phenyltris(dimethylsiloxy)silane, methylhydrocyclosiloxanes, tetrakis(dimethylsiloxy)silane, dimethylsilane, diethylsilane, diphenylsilane, phenylmethylsilane, methylsilane, phenylsilane, etc.

Examples of monomer containing both hydrosilyl groups and latent hydrolyzable groups include dichlorosilane, dimethoxysilane, etc. These monomers can be reacted with either the above-mentioned monomers containing vinyl or allyl functional groups with latent hydrolyzable groups or with monomers containing vinyl or allyl groups without latent hydrolyzable groups to form the hyperbranched polymers of this invention having at least two different types of functional groups including hydrolyzable functional groups that are substantially uniformly distributed throughout the hyperbranched polymer molecule and vinyl, allyl or hydrosilyl functional groups substantially uniformly distributed as terminal end-groups of the hyperbranched polymer molecule.

Examples of monomers having vinyl or allyl reactive functional groups without latent hydrolyzable groups include diallyldimethylsilane, diallyldiphenylsilane, 1,3-diallyltetrakis-(trimethylsiloxy)-disiloxane, 1,3-diallyltetramethyldisiloxane, divinyldimethylsilane, 1,3-divinyl-1,3-diphenyl-1,3-dimethyl-disiloxane, 1,5-divinyl-3,3-diphenyltetramethyltrisiloxane, 1,5-divinylhexamethyltrisiloxane, 1,5-divinyl-3-phenylpentamethyltrisiloxane, divinyltetrakis(trimethylsiloxy)disiloxane, divinyltetramethyldisilane, 1,3-divinyltetramethyl-disiloxane, 1,4-divinyltetramethyl-disilylethane, divinyltetraphenyldisiloxane, tris(vinyldimethylsiloxy)methylsilane, tris(vinyldimethylsiloxy)phenylsilane, trivinylmethylsilane, 1,3,5-trivinyl-1,1,3,5,5-pentamethyltrisiloxane, 1,3,5-trivinyl-1,3,5-trimethylcyclotrisiloxane, and divinyldimethylsilane.

The degree of branching of the hyperbranched polymers used in this invention is not critical. However, the degree of branching is sufficiently low (e.g., less than 95%, even less than 90%) to distinguish the hyperbranched polymers from dendrimers, which in the ideal case have a degree of branching of 100%. The hyperbranched polymers used in this invention will typically have a degree of branching of from about 20% to about 55%, and more typically from about 25% to about 45%. Such hyperbranched polymers can be easily prepared and are relatively inexpensive as compared with dendrimers.

The average degree of branching ($\overline{DB}$) is defined as the number average fraction of branching groups per molecule, i.e., the ratio of terminal groups plus branched groups to the total number of terminal groups, branched groups, and linear groups. For ideal dendrons and dendrimers the degree of branching is 1. For ideal linear polymers the degree of branching is 0. The degree of branching is expressed mathematically as follows:

$$\overline{DB} = \frac{N_t + N_b}{N_t + N_b + N_l}$$

where $N_t$ represents the number of terminal units, $N_b$ represents the number of branched units, and $N_l$ represents the number of linear units, as defined in Hawker, C. J.; Lee, R.; Fréchet, J. M. J., *J. Am. Chem Soc.*, 1991, 113, 4583.

The hyperbranched polymers used in this invention may generally have a weight average molecular weight of from about 1000 to about 25,000; preferably from about 2000 to about 20,000; and more preferably from about 2000 to about 10,000.

The hyperbranched polymers of this invention may be used for preparing curable polymer compositions and cured compositions wherein the hyperbranched polymers containing latent functional groups (functional groups that do not react signficantly during polymerization reaction but can react under a different set of conditions) are covalently bonded to each other by reaction of the terminal end-groups (e.g., vinyl, allyl or hydrosilyl) with a connector or cross-linking agent. In general, the hyperbranched polymers of this invention may be covalently connected to each other to form a nano-domain-structured network using alpha,omega-telechelic linear polymers or oligomers, multi-functional linear polymers with functional groups pendant to the main chain backbone, and/or multi-functional randomly branched polymers having functional groups regularly or randomly distributed in the main or in the side chains. Other types of connectors may include di- or multi-functional low molecular weight non-polymeric compounds that can react with the terminal functional groups of the hyperbranched polymer. Connectors may also include multi-arm star polymers, dendrimers, dendrons, Comb-burst™ dendrigrafts, traditional branched polymers, homologously derivatized or other hyperbranched polymers, or other architecturally specific macromolecules. Nano-domained networks formed from the hyperbranched polymers of this invention may be viewed as three-dimensional, cross-linked materials comprising covalently bonded nanoscopic, hyperbranched domains which may be of the same or different chemical composition from the rest of the network, and which contain latent functional groups substantially uniformly distributed throughout the volume of the hyperbranched domains. Examples of alpha,omega-telechelic linear polymers that may be used for connecting (i.e., cross-linking) include those having purely organic, or inorganic (such as siloxane), or organo-inorganic (such as carbosilane), backbone, with specific examples including polysiloxanes, such as polydimethylsiloxane, and having appropriate terminal functional groups that will react with the terminal functional groups of the hyperbranched polymer molecules.

In accordance with a preferred aspect of this invention, curable compositions can be prepared by combining the hyperbranched polymers with the connectors or cross-linkers. Depending on the selection of the hyperbranched polymer or hyperbranched polymers and connectors or cross-linkers, and other additives, various coating compositions, adhesives, sealents, films, sheets, membranes or other objects may be prepared. Such compositions may be prepared as one-part systems well in advance of their use, or as two-part systems that are combined just prior to use.

Depending on the chemistry utilized, initiators and catalysts may be included in the composition in effective amounts as appropriate. Depending on the type of composition that is being produced, fillers, pigments, dies, antioxidants, fiber or particulate reinforcing agents, impact modifying agents, UV stabilizers, and the like may be added in effective amounts. In certain applications, it may be desirable to add small amounts of solvents.

The curable compositions of this invention may contain one hyperbranched polymer or a combination of two or more different hyperbranched polymers having the same or different chemical structure and having the same or different terminal groups. Similarly, the curable compositions may contain a single connector or cross-linking agent, or a combination of two or more connectors/cross-linking agents.

The cured (cross-linked) nano-domain-structured networks may or may not comprise domains of different chemical composition. However, architectural differences may result in different relative densities, shapes and sizes. Some of these structural features can be controlled by appropriate selection of precursor moieties and by the reaction conditions employed. In general, the relative size of hyperbranched polymers are smaller (ranging from about 1 to about 5, 10, or 15 nm) than their linear counterparts of equivalent molecular weight. The resulting three-dimensional cross-linked materials comprise covalently bonded nanoscopic, hyperbranched domains which may be of the same or different chemical compositions than the linear polymers comprising the rest of the network. These materials may be formed into films, sheets, membranes, coatings or other objects, and may exhibit glass transition temperatures that may rank them among either elastomers or plastomers. These and other properties of these networks depend on the selection of precursor polymers, including their chemical composition, molecular architecture, molecular weight and molecular weight distribution. The materials may also exhibit high thermal stability, mechanical strength and toughness, and offer new ways for preparing specialty membranes, protective coatings, photoresists, novel composites, controlled porosity materials, etc.

Figure 1:
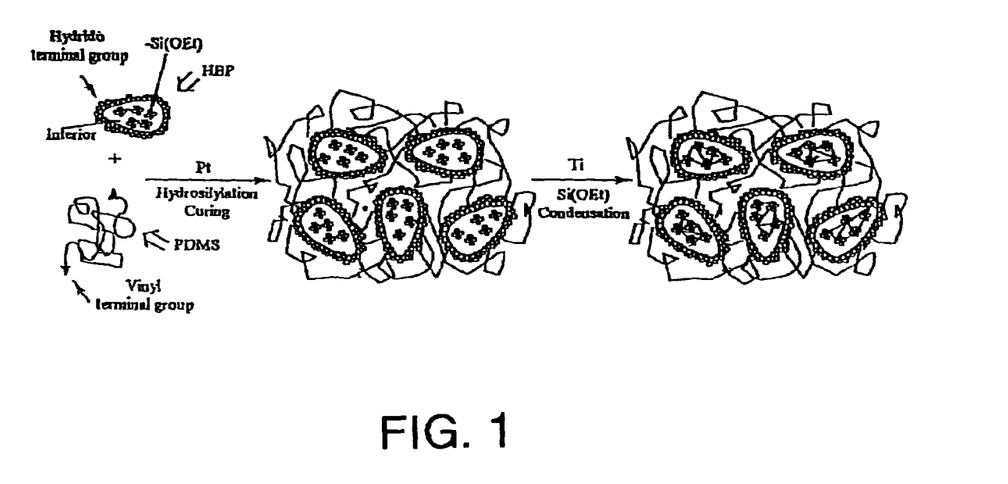
FIG. 1 is a schematic representation of the formation of an inter-domained cross-linked network accompanied by and/or followed by intra-domain cross-linking through latent functionalities (HBP: hyperbranched polymer (network precursor); PDMS polydimethylsiloxane).

A particularly interesting use for the hyperbranched polymers of this invention (especially polycarbosilanes, polycarbosiloxanes, polycarbosilazenes and copolymers thereof) is in the preparation of gaskets, o-rings, sealents, and sealing coatings exhibiting elasticity, heat resistance, and other properties comparable to conventional silicone compositions, but exhibiting improved mechanical properties (e.g., tensile strength and abrasion resistance) that are superior to conventional silicone compositions. In accordance with this aspect of the invention, latent hydrolyzable groups (e.g., ethoxy) substantially uniformly distributed throughout the volume of the hyperbranched domains may be reacted, such as with water, to undergo hydrolysis and condensation to form nanoscopic silica-like inorganic structures distributed throughout the hyperbranched domains. To increase the cross-link density of these structures, co-reactants, such as tetraethoxysilane (TEOS), may be added into the domains containing latent hydrolyzable groups either before or after the A+B polymerization reaction. These nano-scaled silica-like, particle-like structures serve as in situ formed reinforcing agents that improve the mechanical properties of the composition. It is generally known that the improvement in mechanical properties achieved with inorganic particulate reinforcing agents is inversely related to the average diameter of the reinforcing particles. In the scope of this invention, the inorganic particle-like reinforcing structures have dimensions on the order of from about 1 to about 5, 10, or 15 nm. Additionally, the inorganic silica reinforcing structures of this invention are very uniformly distributed throughout the hyperbranched domains and are covalently bonded thereto, and therefore significantly improve the mechanical properties of the cured compositions of this invention. An illustration of this procedure is shown in FIG. 1.

EXAMPLES

Example 1

Preparation of Dual Functionalized Hyperbranched poly(carbosiloxane) HB-DVSi$_2$(OEt)$_4$DS-TDMSS-SiMe$_2$H with Reactive Ethoxysilyl and Hydrosilane Groups from (CH$_2$=CHSi(OEt)$_2$)$_2$O and Si(OSiMe$_2$H)$_4$(an A$_2$B$_4$+C$_4$ System)

A 250 ml two-necked, round-bottomed flask equipped with a vertical cooling condenser was charged with 0.1550 g Platinum-divinyltetramethyldisiloxane complex in xylene (Karstedt catalyst, ~2% platinum in xylene). The flask was flushed with N$_2$ for 1 min. A mixture of 1,3-divinyltetra-ethoxyldisiloxane (30.00 g, 95%, 92.98 mmol) and tetrakis (dimethylsiloxy)silane (45.83 g, 139.40 mmol) was poured into the two-necked, round-bottomed flask with stirring. The resulting mixture was stirred at room temperature for 40 min., and then heated in an oil bath kept at 50° C. for 16 h. The obtained viscous oil was washed by acetonitril (50×3 ml). The volatiles were stripped off by rotvap in vacuum, and they were further dried in vacuo for 16 h to give a slightly yellowish oil (63 g). $^1$H NMR in CDCl$_3$: 0.051 ppm (s, SiCH$_3$), 0.056 ppm (s, SiCH$_3$), 0.065 ppm (s, SiCH$_3$), 0.112 ppm (s, SiCH$_3$), 0.119 ppm (s, SiCH$_3$), 0.158 ppm (s, SiCH$_3$), 0.168 ppm (s, SiCH$_3$), 0.178 ppm (s, SiCH$_3$), 0.53-0.57 ppm (broad, m, CH$_2$CH$_2$), 1.09 ppm (d, C$\underline{H}_3$CH, J 7.324 Hz, trace amount), 1.18 ppm (t, OCH$_2$C$\underline{H}_3$, J 6.592 Hz), 3.78 ppm (q, OC$\underline{H}_2$CH$_3$, J 6.837 Hz), 4.68 ppm (m, SiH). $^{13}$C{$^1$H} NMR in CDCl$_3$: −1.13 ppm (s, SiCH$_3$), 0.13 ppm (s, SiCH$_3$), 2.75 ppm (s, SiCH$_3$), 6.54 ppm (s, CH$_2$CH$_2$), 7.39 ppm (s, CH$_2$CH$_2$), 8.79 ppm(s, CH$_2$CH$_2$), 18.05 (s, OCH$_2$C$\underline{H}_3$), 57.96 ppm (s, OC$\underline{H}_2$CH$_3$). $^{29}$Si{$^1$H} NMR in CDCl$_3$: (−150.6)-(−104.0) ppm [m, Si(O—)$_4$], (−54.4)-(−52.7) ppm [m, Si(OEt)$_2$], (−6.6)-(−5.5) ppm (m, SiH), 8.9-10.1 ppm [m, Si(CH$_3$)$_2$]. IR on KBr disc (selected resonance): 2133 cm$^{-1}$ [ν(SiH)], 960 cm$^{-1}$ [ν(Si—O—C$_2$H$_5$)]. GPC (Column set: polymer lab columns 300×7.5 Plgel 10 u mixed 10 M-MIXED –34-23, 10 M-M34-2, Plgel 100 A, Plgel 50 A. Solvent: toluene. Standard: polystyrene 800-300,000): Mn 2809, Mw 7540, Polydispersity 2.68.

Example 2

Curing of HB-DVSi$_2$ (OEt)$_4$DS-TDMSS-SiMe$_2$H of Example 1 with Alpha,omega-telechelic Vinyl-terminated Polydimethylsiloxane CH$_2$=CHSiMe$_2$O(SiMe$_2$O)$_n$SiMe$_2$CH=CH$_2$(MW 62,700, 1.20 g) was dissolved in 3.5 mL hexanes in a 15 mL vial. To the solution were added and dissolved in following sequence: 0.1 mL hexanes solution of 3-methyl-1-pentyn-3-ol (0.30 g/mL); 0.1 mL hexanes solution of platinum—divinyltetramethyldisiloxane complex in xylene (Karstedt catalyst, ~2% platinum in xylene) (0.2 g xylene solution in 1 mL hexanes); HB-DVSi$_2$ (OEt)$_4$ DS-TDMSS-SiMe$_2$H (0.30 g); and 0.1 g titanium di-n-butoxide(bis-2,4-pentanedionate) (73% in butanol). The resulting solution was cast onto a Ti coated PET plate which was wet by (EtO)$_4$Si and dried in the air prior casting, and the coating was cured at 120° C. for 20 min to yield an insoluble slightly yellowish coating.

Example 3

Curing of HB-DVSi$_2$(OEt)$_4$DS-TDMSS-SiMe$_2$H Example of 1 with Two Alpha,omega-telechelic Vinyl-terminated Polydimethylsiloxanes (MW 62,700 and MW 165,000)

CH$_2$=CHSiMe$_2$O(SiMe$_2$O)$_n$SiMe$_2$CH=CH$_2$ (MW 62,700, 0.9 g) and CH$_2$=CHSiMe$_2$O(SiMe$_2$O)$_n$ SiMe$_2$CH=CH$_2$ (MW 165,000, 0.9 g) were dissolved in 8 mL hexanes in a 20 mL vial. To the solution were added and dissolved in the following sequence: 0.15 mL hexanes solution of 3-methyl-1-pentyn-3-ol (0.20g/mL); 0.15 mL hexanes solution of platinum—divinyltetramethyldisiloxane complex in xylene (Karstedt catalyst, ~2% platinum in xylene) (0.20 g xylene solution in 1 mL hexanes); HB-DVSi$_2$(OEt)$_4$DS-TDMSS-SiMe$_2$H (0.45 g); 0.05 g titanium di-n-butoxide(bis-2,4-pentanedionate) solution (73% in butanol), and 0.2 mL THF solution of (3-glycidoxypropyl)dimethylethoxysilane (0.25 g/ml). The resulting solution was cast onto a Ti coated PET plate, and cured at 150° C. for 20 min to yield an insoluble slightly yellowish coating.

Example 4

Curing of HB-DVSi$_2$(OEt)$_4$DS-TDMSS-SiMe$_2$H Example of 1 with Two Alpha,omega-telechelic Vinyl-terminated Polydimethylsiloxanes (MW 62,700 and MW 165,000) and Post-treatment with Tetraethyl Orthosilicate CH$_2$=CHSiMe$_2$O(SiMe$_2$O)$_n$SiMe$_2$CH=CH$_2$ (MW 62,700, 8 g) and CH$_2$=CHSiMe$_2$O(SiMe$_2$O)$_n$ SiMe$_2$CH=CH$_2$ (MW 165,000, 8 g) were dissolved in 20 mL hexanes in a 250 mL beaker. To the solution were added and dissolved in following sequence: 1.2 g 3-methyl-1-pentyn-3-ol; 0.20 g platinum-divinyltetramethyldisiloxane complex in xylene (Karstedt catalyst, ~2% platinum in xylene); 4.0 g HB-DVSi$_2$(OEt)$_4$ DS-TDMSS-SiMe 2H; and 1.2 g titanium di-n-butoxide(bis-2,4-pentanedionate) solution (73% in butanol). Most volatiles were removed by blowing N$_2$ at the surface of the formulation. The resulting viscous solution was cast onto a mold and dried in the air for 4 days. It was then cured at 55° C. for 1 hour, 80° C. for 1.5 h, 155° C. for 1 hour to give a yellow brownish rubber, free of air bubbles. Shore A durometer showed average reading 31.4. The obtained silicone rubber was soaked in tetraethyl orthosilicate for 16 hours, and kept at 150° C. in an oven for 1 hour to give a tougher elastic rubber. Shore A durometer showed average reading 40.

The above description is considered that of the preferred embodiments only. Modifications of the invention will occur to those skilled in the art and to those who make or use the invention. Therefore, it is understood that the embodiments described above are merely for illustrative purposes and are not intended to limit the scope of the invention, which is defined by the following claims as interpreted according to the principles of patent law, including the doctrine of equivalents.

The invention claimed is:

1. A cross-linked polymer network containing nanoscopic reinforcing domains, comprising:
    hyperbranched polymer domains containing reinforcing structures distributed in and covalently bonded to the hyperbranched polymer domains; and
    a cross-linker covalently bonding the hyperbranched polymer domains together.

2. The network of claim 1, wherein the hyperbranched polymer domains are a product of a polymerization reaction of a first monomer having two or more reactive functional groups of the first type (A) and a second monomer having two or more reactive functional groups of the second type (B), at least one of the monomers having three or more reactive functional groups and at least one of the monomers having at least one latent functional group (C) that does not react significantly during the polymerization of the hyperbranched polymer.

3. The network of claim 1, wherein the hyperbranched polymer domains are a product of a polymerization reaction of a first monomer having two or more vinyl or allyl reactive functional groups (A) and a second monomer having two or more hydrosilyl reactive functional groups (B), at least one of the monomers having three or more reactive functional groups and at least one of the monomers having at least one latent functional group (C) that does not react significantly during the polymerization of the hyperbranched polymer.

4. The network of claim 1, wherein the hyperbranched polymer domains are a product of a polymerization reaction of a monomer having at least one reactive functional group of the first type (A), at least two reactive functional groups of the second type (B) and at least one latent functional group (C) that does not react significantly during the polymerization of the hyperbranched polymer.

5. The network of claim 1, wherein the hyperbranched polymer domains are a product of a polymerization reaction of a monomer having at least one hydrosilyl reactive functional group (A), at least two vinyl or allyl reactive functional groups (B) and at least one latent functional group (C) that does not react significantly during the polymerization of the hyperbranched polymer.

6. The network of claim 1, wherein the hyperbranched polymer domains are a product of a polymerization reaction of a monomer having at least one vinyl or allyl reactive functional group (A), at least two hydrosilyl reactive functional groups (B) and at least one latent functional group (C) that does not react significantly during the polymerization of the hyperbranched polymer.

7. The network of claim 1, wherein the hyperbranched polymer domains are a product of a polymerization reaction involving more than two mutually reactive monomers wherein at least one of the monomers has two or more reactive functional groups of the first type (A) and at least one of the other monomers has three or more reactive functional groups of the second type (B), at least one of the monomers having at least one latent functional group (C) that does not react significantly during the polymerization of the hyperbranched polymer.

8. The network of claim 1, wherein the hyperbranched polymer domains are a product of a polymerization reaction of a first monomer having two or more reactive functional groups of the first type (A) and a second monomer having two or more reactive functional groups of the second type (B), at least one of the monomers having three or more reactive functional groups and wherein one of the monomers having at least one latent functional group (C) and the other monomer having at least one latent functional group (D) wherein these latent functional groups are capable of reaction between themselves under reaction conditions that are different from the polymerization reaction conditions.

9. The network of claim 1, wherein the hyperbranched polymer domains are a product of a polymerization reaction of a monomer having at least one reactive functional group of the first type (A), at least two reactive functional groups of the second type (B) and at least two latent functional groups (C and D) that do not react significantly during the polymerization of the hyperbranched polymer but are capable of reaction between themselves under reaction conditions that are different from the polymerization reaction conditions.

10. The network of claim 1, wherein the hyperbranched polymer domains are a product of a polymerization reaction involving more than two mutually reactive monomers wherein at least one of the monomers has two or more reactive functional groups of the first type (A) and at least one of the other monomers having three or more reactive functional groups of the second type (B), at least one of the monomers having at least two latent functional group (C and D) or at least one of the reacting monomers having one type of latent functional groups (C) while at least one of the other monomers having at least one of another reactive functional groups (D) wherein the latent functional groups (C and D) do not react significantly during the polymerization of the hyperbranched polymer but are capable of reaction between themselves under reaction conditions that are different from the polymerization reaction conditions.

11. The network of claim 1, wherein the hyperbranched polymer domains are a product of a polymerization reaction of a monomer having two or more hydrosilyl groups, and a monomer selected from the group consisting of diallyldimethylsilane, diallyldiphenylsilane, 1,3-diallyltetrakis(trimethylsiloxy)-disiloxane, 1,3-diallyltetramethyldisiloxane, divinyldimethylsilane, 1,3-divinyl-1,3-diphenyl-1,3-dimethyl-disiloxane, 1,5-divinyl-3,3-diphenyltetramethyltrisiloxane, 1,5-divinylhexamethyltrisiloxane, 1,5-divinyl-3-phenylpentamethyltrisiloxane, divinyltetrakis(trimethylsiloxy)disiloxane, divinyltetramethyldisilane, 1,3-divinyltetramethyldisiloxane, 1,4-divinyltetramethyldisilylethane, divinyltetraphenyldisiloxane, tris(vinyldimethylsiloxy)methylsilane, tris(vinyldimethylsiloxy)phenylsilane, trivinylmethylsilane, 1,3,5-trivinyl-1,1,3,5,5-pentamethyltrisiloxane, 1,3,5-trivinyl-1,3,5-trimethylcyclotrisiloxane, and divinyldimethylsilane.

12. The network of claim 1, wherein the hyperbranched polymer domains are a product of a polymerization reaction of a monomer having at least two vinyl or allyl groups, and a monomer selected from the group consisting of 1,1,3,3-tetramethyldisiloxane, methyltris(dimethylsiloxy)silane, phenyltris(dimethylsiloxy)silane, methylhydrocyclosiloxanes, tetrakis(dimethylsiloxy)silane, dimethylsilane, diethylsilane, diphenylsilane, phenylmethylsilane, methylsilane, and phenylsilane.

13. The network of claim 1, wherein the cross-linker is an alpha,omega-telechelic linear polymer or oligomer.

14. The network of claim 13, wherein the alpha,omega-telechelic linear polymer or oligomer has a polysiloxane backbone.

15. The network of claim 13, wherein the alpha,omega-telechelic linear polymer or oligomer is a polydialkylsiloxane.

16. the network of claim 1, wherein the cross-linker is a multi-functional linear polymer with functional groups pendant to the main chain backbone.

17. The network of claim 1, wherein the cross-linker is a multi-functional branched polymer having functional groups regularly or randomly distributed in the main or in the side chains.

18. The network of claim 1, wherein the cross-linker is a di- or multi-functional non-polymeric compound that can react with terminal functional groups at the surface of the hyperbranched polymer.

19. The network of claim 1, wherein the cross-linker is selected from the group consisting of multi-arm star polymers, dendrimers, dendrons, dendrigrafts and hyperbranched polymers.

20. The network of claim 1, wherein the reinforcing structures distributed in and covalently bonded to the hyperbranched polymer are the in situ condensation product of hydrolyzable groups bonded to a silicon atom.

21. The network of claim 1, wherein the reinforcing structures distributed in and covalently bonded to the hyperbranched polymer have dimensions of from about 1 to about 15 nanometers.

22. A process for making a cross-linked polymer network containing nanoscopic reinforcing domains comprising the steps of: reacting a hyperbranched polymer containing latent functional groups capable of being reacted to form reinforcing structures distributed in and covalently bonded to the hyperbranched polymer with a cross-linker to covalently bond the hyperbranched polymer molecules together to form a cross-linked polymer network having hyperbranched polymer domains; and reacting the latent functional groups to form reinforcing structures distributed in and covalently bonded to the hyperbranched polymer domains.

23. The process of claim 22, wherein the hyperbranched polymer is a product of a polymerization reaction of a first monomer having two or more reactive functional groups of the first type (A) and a second monomer having two or more reactive functional groups of the second type (B), at least one of the monomers having three or more reactive functional groups and at least one of the monomers having at least one latent functional group (C) that does not react significantly during the polymerization of the hyperbranched polymer.

24. The process of claim 22, wherein the hyperbranched polymer is a product of a polymerization reaction of a first monomer having two or more vinyl or allyl reactive functional groups (A) and a second monomer having two or more hydrosilyl reactive functional groups (B), at least one of the monomers having three or more reactive functional groups and at least one of the monomers having at least one latent functional group (C) that does not react significantly during the polymerization of the hyperbranched polymer.

25. The process of claim 22, wherein the hyperbranched polymer is a product of a polymerization reaction of a monomer having at least one reactive functional group of the first type (A), at least two reactive functional groups of the second type (B) and at least one latent functional group (C) that does not react significantly during the polymerization of the hyperbranched polymer.

26. The process of claim 22, wherein the hyperbranched polymer is a product of a polymerization reaction of a monomer having at least one hydrosilyl reactive functional group (A), at least two vinyl or allyl reactive functional groups (B) and at least one latent functional group (C) that does not react significantly during the polymerization of the hyperbranched polymer.

27. The process of claim 22, wherein the hyperbranched polymer is a product of a polymerization reaction of a monomer having at least one vinyl or allyl reactive functional group (A), at least two hydrosilyl reactive functional groups (B) and at least one latent functional group (C) that does not react significantly during the polymerization of the hyperbranched polymer.

28. The process of claim 22, wherein the hyperbranched polymer is a product of a polymerization reaction involving more than two mutually reactive monomers wherein at least one of the monomers has two or more reactive functional groups of the first type (A) and at least one of the other monomers has three or more reactive functional groups of the second type (B), at least one of the monomers having at least one latent functional group (C) that does not react significantly during the polymerization of the hyperbranched polymer.

29. The process of claim 22, wherein the hyperbranched polymer is a product of a polymerization reaction of a first monomer having two or more reactive functional groups of the first type (A) and a second monomer having two or more reactive functional groups of the second type (B), at least one of the monomers having three or more reactive functional groups and wherein one of the monomers having at least one latent functional group (C) and the other monomer having at least one latent functional group (D) wherein these latent functional groups are capable of reaction between themselves under reaction conditions that are different from the polymerization reaction conditions.

30. The process of claim 22, wherein the hyperbranched polymer is a product of a polymerization reaction of a monomer having at least one reactive functional group of the first type (A), at least two reactive functional groups of the second type (B) and at least two latent functional groups (C and D) that do not react significantly during the polymerization of the hyperbranched polymer but are capable of reaction between themselves under reaction conditions that are different from the polymerization reaction conditions.

31. The process of claim 22, wherein the hyperbranched polymer is a product of a polymerization reaction involving more than two mutually reactive monomers wherein at least one of the monomers has two or more reactive functional groups of the first type (A) and at least one of the other monomers having three or more reactive functional groups of the second type (B), at least one of the monomers having at least two latent functional group (C and D) or at least one of the reacting monomers having one type of latent functional groups (C) while at least one of the other monomers having at least one of another reactive functional groups (D) wherein the latent functional groups (C and D) do not react significantly during the polymerization of the hyperbranched polymer but are capable of reaction between themselves under reaction conditions that are different from the polymerization reaction conditions.

32. The process of claim 22, wherein the hyperbranched polymer is a product of a polymerization reaction of a monomer having two or more hydrosilyl groups, and a monomer selected from the group consisting of diallyldimethylsilane, diallyldiphenylsilane, 1,3-diallyltetrakis(trimethylsiloxy)­disiloxane, 1,3-diallyltetramethyldisiloxane, divinyldimeth­ylsilane, 1,3-divinyl-1,3-diphenyl-1,3-dimethyl-disiloxane, 1,5-divinyl-3,3-diphenyltetramethyltrisiloxane, 1,5-divinyl-hexamethyltrisiloxane, 1,5-divinyl-3-phenylpentamethyl­trisiloxane, divinyltetrakis(trimethylsiloxy)disiloxane, divinyltetramethyldisilane, 1,3-divinyltetramethyldisiloxane, 1,4-divinyltetramethyldisilylethane, divinyltetraphenyldisi­loxane, tris(vinyldimethylsiloxy)methylsilane, tris(vi­nyldimethylsiloxy)phenylsilane, trivinylmethylsilane, 1,3,5-trivinyl-1,1,3,5,5-pentamethyltrisiloxane, 1,3,5-trivinyl-1,3,5-trimethylcyclotrisiloxane, and divinyldimethylsilane.

33. The process of claim 22, wherein the hyperbranched polymer is a product of a polymerization reaction of a monomer having at least two vinyl or allyl groups, and a monomer selected from the group consisting of 1,1,3,3-tetramethyld­isiloxane, methyltris(dimethylsiloxy)silane, phenyltris(dim­ethylsiloxy)silane, methyihydrocyclosiloxanes, tetrakis(dimethylsiloxy)silane, dimethylsilane, diethylsilane, diphenylsilane, phenylmethylsilane, methylsilane, and phe­nylsilane.

34. The process of claim 22, wherein the cross-linker is an alpha,omega-telechelic linear polymer or oligomer.

35. The process of claim 34, wherein the alpha,omega-telechelic linear polymer or oligomer has a polysiloxane backbone.

36. The process of claim 34, wherein the alpha,omega-telechelic linear polymer or oligomer is a polydialkylsilox­ane.

37. The process of claim 22, wherein the cross-linker is a multi-functional linear polymer with functional groups pen­dant to the main chain backbone.

38. The process of claim 22, wherein the cross-linker is a multi-functional traditional branched polymer having func­tional groups regularly or randomly distributed in the main or in the side chains.

39. The process of claim 22, wherein the cross-linker is a di- or multi-functional non-polymeric compound that can react with terminal functional groups at the surface of the hyperbranched polymer.

40. The process of claim 22, wherein the cross-linker is selected from the group consisting of multi-arm star poly­mers, dendrimers, dendrons, dendrigrafts and hyperbranched polymers.

41. The process of claim 22, wherein the crosslinking of the hyperbranched polymer precursor(s) is achieved by the hydrolysis of functional groups that were substantially uni­formly distributed at the terminals of the hyperbranched poly­mer molecules.

42. The process of claim 22, wherein the reinforcing struc­tures distributed in and covalently bonded to the hyper­branched polymer are the in situ condensation product of hydrolyzable groups bonded to a silicon atom.

43. The process of claim 22, wherein the reinforcing struc­tures distributed in and covalently bonded to the hyper­branched polymer have dimensions of from about 1 to about 15 nanometers.

* * * * *

UNITED STATES PATENT AND TRADEMARK OFFICE
CERTIFICATE OF CORRECTION

PATENT NO.       : 7,446,155 B2
APPLICATION NO.  : 11/206459
DATED            : November 4, 2008
INVENTOR(S)      : Petar R. Dvornic et al.

It is certified that error appears in the above-identified patent and that said Letters Patent is hereby corrected as shown below:

Column 3:
Line 45, "or" should be -- of --.

Column 4:
Line 51, Before "Where" insert -- * --.

Column 6:
Line 31, "signficantly" should be -- significantly --.

Column 7:
Line 4, "sealents" should be -- sealants --.
Line 50, "sealents" should be -- sealants --.

Column 8:
Line 41, "(d, C<u>H</u>" should be -- (d, C<u>H</u> --.
Line 48, "[m, Si(O—)" should be -- [m, Si(O-) --.
Line 51, "[v(Si—O—C" should be -- [v(Si-O-C --.

Column 9:
Line 2, "˜2%" should be-- ˜2% --.
Line 7, After "prior" insert -- to --.
Line 24, "˜2%" should be -- ˜2% --.
Line 29, "(0.25g/ml)" should be -- (0.25g/mL) --.
Line 46, "˜2%" should be -- ˜2% --.
Line 47, "DS-TDMSS-SiMe 2H" should be -- DS-TDMSS-SiMe$_2$H --.

Column 11:
Line 21, "two functional group" should be -- two functional groups --.
Lines 22 and 24, "latent functional groups (C) . . . latent functional groups (D)" should be -- latent functional group (C) . . . latent functional group (D) --.
Line 65, "the" should be -- The -- (1st occurrence).

UNITED STATES PATENT AND TRADEMARK OFFICE
CERTIFICATE OF CORRECTION

PATENT NO. : 7,446,155 B2
APPLICATION NO. : 11/206459
DATED : November 4, 2008
INVENTOR(S) : Petar R. Dvornic et al.

It is certified that error appears in the above-identified patent and that said Letters Patent is hereby corrected as shown below:

Column 13:
Lines 45 and 46, "latent functional groups (C) . . . latent functional groups (D)" should be -- latent functional group (C) . . . latent functional group (D) --.

Signed and Sealed this

Eleventh Day of August, 2009

David J. Kappos
*Director of the United States Patent and Trademark Office*